United States Patent
Konen et al.

(10) Patent No.: US 10,005,483 B1
(45) Date of Patent: Jun. 26, 2018

(54) HAND TRUCK WITH STABILIZER PLATE

(71) Applicant: The Boeing Company, Chicago, IL (US)

(72) Inventors: Michael H. Konen, Marysville, WA (US); Miriam Beatriz Lusk, Everett, WA (US); Michael Anthony Turcotte, Everett, WA (US); Joseph Doran, Everett, WA (US); Tae Ho Kim, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days. days.

(21) Appl. No.: 15/419,821

(22) Filed: Jan. 30, 2017

(51) Int. Cl.
*B62B 1/12* (2006.01)
*B62B 3/08* (2006.01)
*B62B 3/06* (2006.01)

(52) U.S. Cl.
CPC .............. *B62B 3/08* (2013.01); *B62B 3/0612* (2013.01); *B62B 3/0618* (2013.01); *B62B 3/0625* (2013.01); *B62B 2206/06* (2013.01); *B62B 2301/044* (2013.01); *B62B 2301/20* (2013.01)

(58) Field of Classification Search
CPC .... B62B 1/00; B62B 1/10; B62B 3/00; B62B 3/022; B62B 3/08; B62B 1/125
USPC ....... 414/444, 448, 449, 490, 493, 445, 446, 414/451, 455, 456
See application file for complete search history.

(56) References Cited

U.S. PATENT DOCUMENTS

| | | | | |
|---|---|---|---|---|
| 2,197,587 A | * | 4/1940 | Miller | B62B 1/264 280/47.27 |
| 3,193,123 A | * | 7/1965 | Wouden | B62B 1/002 280/47.27 |
| 6,079,941 A | * | 6/2000 | Lee | B62B 3/04 16/35 R |
| 6,425,724 B1 | * | 7/2002 | Williamson | B62B 1/145 280/47.29 |
| 7,389,996 B2 | * | 6/2008 | Dube | B62B 3/104 280/35 |
| 8,192,134 B2 | * | 6/2012 | Brewer, III | B62B 1/14 254/3 C |
| 8,475,109 B2 | * | 7/2013 | Torrison | B62B 3/008 280/47.2 |
| 2006/0182578 A1 | * | 8/2006 | Morton | B62B 3/04 414/537 |
| 2007/0292252 A1 | * | 12/2007 | McGill | B62B 3/008 414/634 |

* cited by examiner

*Primary Examiner* — James R Bidwell
(74) *Attorney, Agent, or Firm* — Duft Bornsen & Fettig LLP

(57) ABSTRACT

A hand truck that includes a carriage, and an elongated frame that connects to a front side of the carriage and is configured to pivot in relation to the carriage. The hand truck also includes a stabilizer plate configured to extend outward from the front side of the carriage to stabilize the hand truck as the elongated frame pivots in relation to the carriage, and to retract inward toward the front side of the carriage.

20 Claims, 6 Drawing Sheets

HAND TRUCK WITH STABILIZER PLATE

FIELD

This disclosure relates to the field of hand trucks.

BACKGROUND

A hand truck is an apparatus used to assist a person in moving large or heavy objects. A traditional hand truck includes a handle at one end, wheels at the base, and a toe plate proximate to the base. When the hand truck is upright, an operator wedges the toe plate underneath the object being moved. The hand truck is then tilted backward so that the weight of the object is balanced on the wheels. This makes the object easier to move.

SUMMARY

Embodiments described herein include an improved hand truck capable of moving and handling large and/or heavy objects. The hand truck as described herein includes a stabilizer plate that extends from a carriage of the hand truck to stabilize the hand truck when an object is being tilted backward or forward. The stabilizer plate retracts when the weight of the object is balanced on the hand truck so that the hand truck can be moved. The implementation of a stabilizer plate as described herein allows for the hand truck to move large and/or heavy loads (e.g., 350 to 550 pounds), and also allows the hand truck to have a narrow and compact profile so that it may be moved through confined spaces with limited width/height, such as doorways.

One embodiment comprises an apparatus comprising a hand truck. The hand truck includes a carriage, and an elongated frame that connects to a front side of the carriage and is configured to pivot in relation to the carriage. The hand truck further includes a stabilizer plate configured to extend outward from the front side of the carriage to stabilize the hand truck as the elongated frame pivots in relation to the carriage, and to retract inward toward the front side of the carriage.

In another embodiment, the stabilizer plate is configured to extend outward from the front side of the carriage and contact a floor as the elongated frame pivots backward from a vertical orientation to a horizontal orientation, and as the elongated frame pivots forward from a horizontal orientation to a vertical orientation.

In another embodiment, the hand truck further includes a toe plate member that extends at an angle from a first end of the elongated frame to engage a load.

In another embodiment, the toe plate member includes a first L-shaped toe plate and a second L-shaped toe plate that are spaced apart by an opening. The stabilizer plate extends and retracts through the opening.

In another embodiment, the carriage includes a base member that is horizontally disposed, front casters attached to the base member toward the front side of the carriage, and rear casters attached to the base member toward a back side of the carriage.

In another embodiment, a mechanical actuator connects between the base member and the elongated frame, and extends and retracts to pivot the elongated frame in relation to the carriage about a pivot member.

In another embodiment, the mechanical actuator comprises a hydraulic cylinder.

In another embodiment, the front casters are mounted between the pivot member and the rear casters.

In another embodiment, air bags are attached between the front casters and the base member, and between the rear casters and the base member to adjust a height of the carriage.

In another embodiment, a linear actuator connects between the base member and the stabilizer plate. The base member includes tracks that slidably engage with opposing sides of the stabilizer plate. The linear actuator applies linear motion to the stabilizer plate to extend and retract the stabilizer plate on the tracks.

In another embodiment, an abrasion-resistant coating is applied to at least one surface of the stabilizer plate.

Another embodiment comprises a hand truck that includes a carriage, and an elongated frame that connects to a front side of the carriage via a pivot member. The elongated frame includes a toe plate member that extends at an angle from a first end of the elongated frame to engage a load. The hand truck further includes a stabilizer plate, and a linear actuator that connects between the carriage and the stabilizer plate. The carriage includes tracks that slidably engage with opposing sides of the stabilizer plate. The linear actuator applies linear motion to the stabilizer plate to extend and retract the stabilizer plate from the front side of the carriage on the tracks.

In another embodiment, the hand truck further includes cam followers having a stud that connects to the stabilizer plate, and having an outer ring that engages the tracks.

In another embodiment, the linear actuator comprises a lead screw having a threaded shaft attached at one end to the carriage, and a nut that is threaded onto the threaded shaft and connected to the stabilizer plate. An electric motor provides a spinning motion to the lead screw to cause translation of the stabilizer plate.

In another embodiment, the stabilizer plate is an elongated member having a first end and an opposing second end along a length of the elongated member. The first end of the stabilizer plate extends outward from the carriage and through an opening in the toe plate member to contact the floor. The stabilizer plate is tapered toward the first end.

In another embodiment, the hand truck further includes an abrasion-resistant coating applied to at least one surface of the stabilizer plate.

In another embodiment, the carriage comprises a base member that is horizontally disposed, front casters attached to the base member toward a front side of the base member, rear casters attached to the base member toward a rear side of the base member, and air bags attached between the front casters and the base member, and between the rear casters and the base member to adjust a height of the carriage.

In another embodiment, the hand truck further includes a mechanical actuator that connects between the base member and the elongated frame, and extends and retracts to pivot the elongated frame in relation to the carriage about the pivot member.

In another embodiment, the mechanical actuator is configured to pivot the elongated frame in relation to the carriage at least 90 degrees.

In another embodiment, the front casters are mounted between the pivot member and the rear casters.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
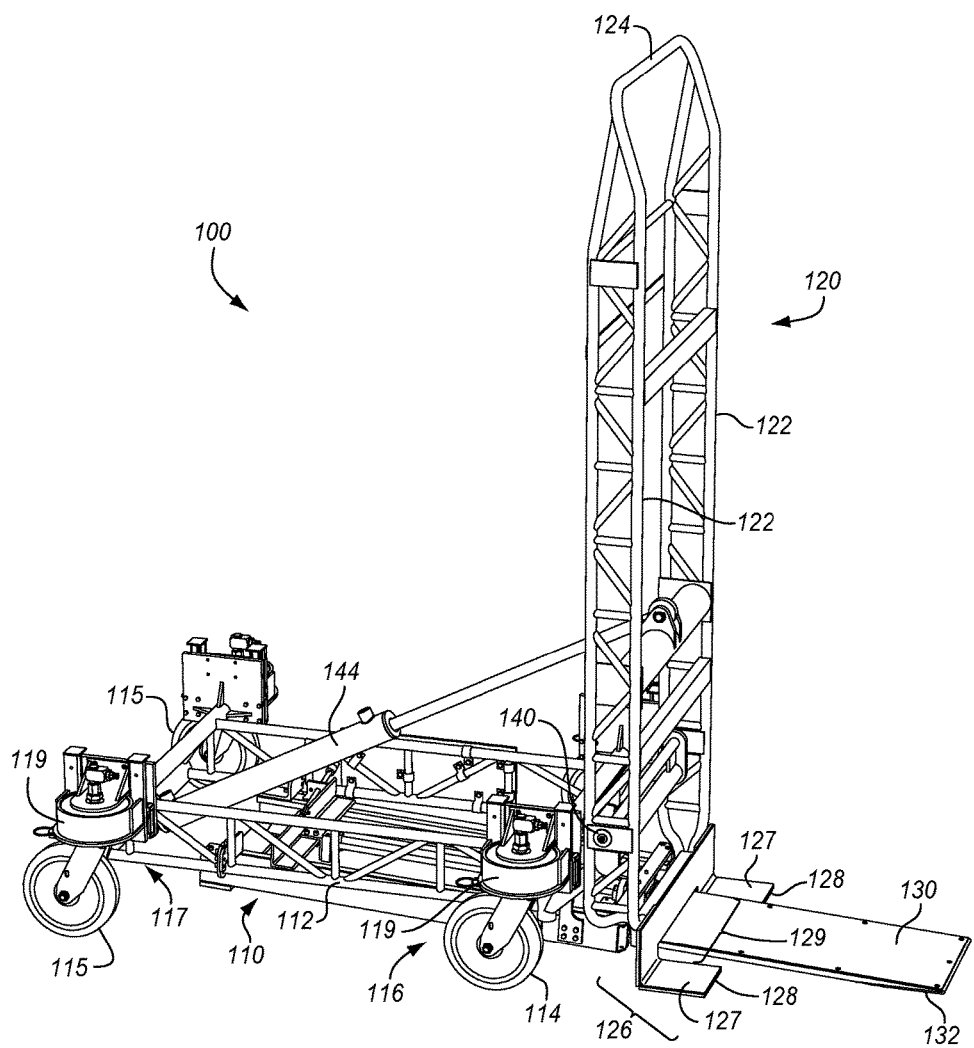
FIG. 1 is a perspective view of a hand truck in an exemplary embodiment.

FIG. 1 is a perspective view of a hand truck 100 in an exemplary embodiment. Hand truck 100 comprises an apparatus or machine that assists a person (i.e., an operator) in moving and handling a load. In this embodiment, hand truck 100 includes a carriage 110, an elongated frame 120 that is configured to pivot with respect to carriage 110, and a stabilizer plate 130. Carriage 110 provides conveyance of hand truck 100 on the ground, the floor, or some other surface. Carriage 110 includes a base member 112, which is a structure that is horizontally disposed. Base member 112 may comprise a rectangular body as illustrated in FIG. 1 that is formed from tubular members, but may have other geometries as desired. Carriage 110 also includes conveyance members that are mounted on base member 112 to allow carriage 110 to roll or otherwise have horizontal movement. In this embodiment, the conveyance members comprise front casters 114 mounted toward a front side 116 of base member 112, and rear casters 115 mounted toward a back side 117 of base member 112. The front side 116 of base member 112 (or carriage 110) is the side closest to a load, and the back side of base member 112 (or carriage 110) is the side opposite the load. Casters 114-115 may be "swivel-type" casters that include a wheel attached to a swivel via an axle, and are able to swivel 360° to allow movement of carriage 110 in any direction. The wheels of the casters may comprise pneumatic wheels to protect the supporting floor material from high pressure loads. In one embodiment, air bags 119 may be mounted between front casters 114 and base member 112, and between rear casters 115 and base member 112 to allow for adjustment of the height/clearance of carriage 110 when desired so that carriage 110 may be moved over a variety of surfaces.

Elongated frame 120 connects to front side 116 of base member 112 via a pivot member 140. Elongated frame 120 is configured to pivot between a vertical orientation and a horizontal orientation (e.g., about 90°) via pivot member 140. For example, pivot member 140 may include a shaft that extends through base member 112 and through elongated frame 120. Elongated frame 120 comprises an element of hand truck 100 that engages a load for transport via hand truck 100. In this embodiment, elongated frame 120 includes co-planar members 122 (e.g., rails) that engage one surface of the load. Elongated frame 120 may also include a compact beam truss-support structure of cross-braces, lattice structures, or other support members that reinforce co-planar members 122. Elongated frame 120 includes a handle 124 that extends from one end, and a toe plate member 126 that extends at an angle from the other distal end of elongated frame 120. Handle 124 is configured to be gripped or grasped by an operator to move/handle hand truck 100. Toe plate member 126 extends at an angle from the other end of elongated frame 120 to engage another surface of the load. In one embodiment, toe plate member 126 includes one or more toe plates 127, which may comprise L-shaped members having a ledge that projects at an angle from elongated frame 120. The bottom surface of toe plates 127 are configured to lie flat against the floor when elongated frame 120 is upright (i.e., in a vertical orientation). Toe plates 127 have a leading edge 128 that is wedged underneath the load, and the top surface of toe plates 127 are configured to slide underneath and engage the load. When toe plates 127 are slid underneath the load, the load also engages co-planar members 122.

Hand truck 100 further includes a mechanical actuator 144 that connects between base member 112 and elongated frame 120. Mechanical actuator 144 is configured to extend and retract to pivot elongated frame 120 in relation to carriage 110 about pivot member 140, such as at least 90°. Examples of mechanical actuator 144 include a hydraulic cylinder (e.g., a pump-activated double acting cylinder), an air cylinder, a mechanical screw, etc.

Stabilizer plate 130 is a component that stabilizes hand truck 100 while tilting a load either backward or forward. In one embodiment, stabilizer plate 130 is an elongated member having a first end 132 and an opposing second end (not visible) along a length of the elongated member. End 132 of stabilizer plate 130 extends outward from carriage 110 between front casters 114 and through an opening 129 in toe plate member 126. Stabilizer plate 130 may be tapered toward end 132 to assist in sliding underneath a load.

Stabilizer plate 130 is slidably attached to base member 112 of carriage 110. Stabilizer plate 130 extends outward from carriage 110 and through opening 129 in toe plate member 126 to contact the ground, the floor, or another surface. Stabilizer plate 130 also retracts inward toward carriage 110 through opening 129 in toe plate member 126 to separate from the ground, a floor, or another surface. One or more surfaces (e.g., the bottom surface and/or the top surface) of stabilizer plate 130 may be coated with an abrasion-resistant coating, such as nylon, to prevent damage to the floor or the load.

Stabilizer plate 130 advantageously supports hand truck 100 when tilting a load. In this embodiment, front casters 114 are mounted between pivot member 140 and rear casters 115. In other words, pivot member 140 is closer to the load than front casters 114. If a load is heavier than carriage 110, then rear casters 115 may come off the ground when attempting to tilt the load backward onto carriage 110 or forward toward the ground. To avoid this situation, stabilizer plate 130 is extended outward from the front side 116 of carriage 110. Stabilizer plate 130 contacts the ground and provides support to hand truck 100. Therefore when attempting to tilt a load, a portion of the weight of the load is supported by stabilizer plate 130 so that rear casters 115 remain in contact with the ground and the load can be effectively tilted backward onto carriage 110 or forward toward the ground.

Figure 2:
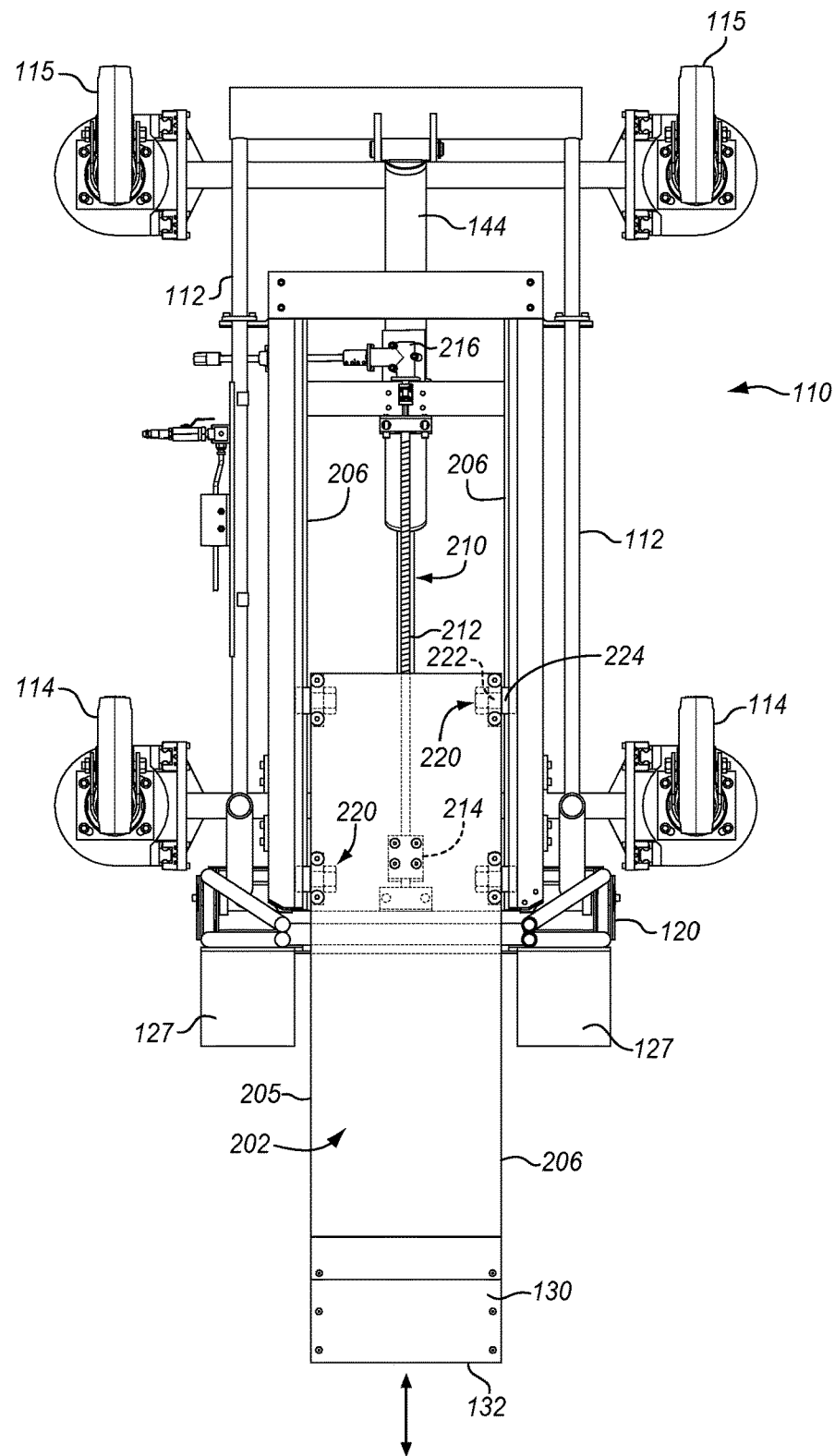
FIG. 2 is a bottom view of a carriage of a hand truck in an exemplary embodiment.

FIG. 2 is a bottom view of carriage 110 in an exemplary embodiment. The bottom view of carriage 110 illustrates stabilizer plate 130 and the drive mechanism used to extend and retract stabilizer plate 130. The bottom surface 202 of stabilizer plate 130 is visible in FIG. 2. To implement the drive mechanism, carriage 110 includes a linear actuator 210 that connects between stabilizer plate 130 and base member 112 of carriage 110, and applies linear motion to stabilizer plate 130 to extend and retract stabilizer plate 130 in relation to carriage 110. One example of linear actuator 210 is a lead screw having a threaded shaft 212 affixed at one end to base member 112, and a nut 214 that is threaded onto threaded shaft 212 and moves along threaded shaft 212 as it turns. Nut 214 is also connected to stabilizer plate 130. A motor 216, such as an electric motor, provides a spinning motion to threaded shaft 212 to cause translation of stabilizer plate 130 (i.e., move back and forth in the direction indicated by the arrows).

Carriage 110 also includes tracks 206 that slidably engage with opposing sides 205-206 of stabilizer plate 130. Tracks 206 comprise any structure that guides and/or supports stabilizer plate 130 as it extends and retracts. In one embodiment, stabilizer plate 130 may engage with tracks 206 via cam followers 220. Cam followers 220 have a stud 222 that connects to stabilizer plate 130, and an outer ring 224 that engages tracks 206. Outer rings 224 of cam followers 220 rotate in relation to studs 222 so that stabilizer plate 130 is able to slide on cam followers 220 along tracks 206.

Figure 3:
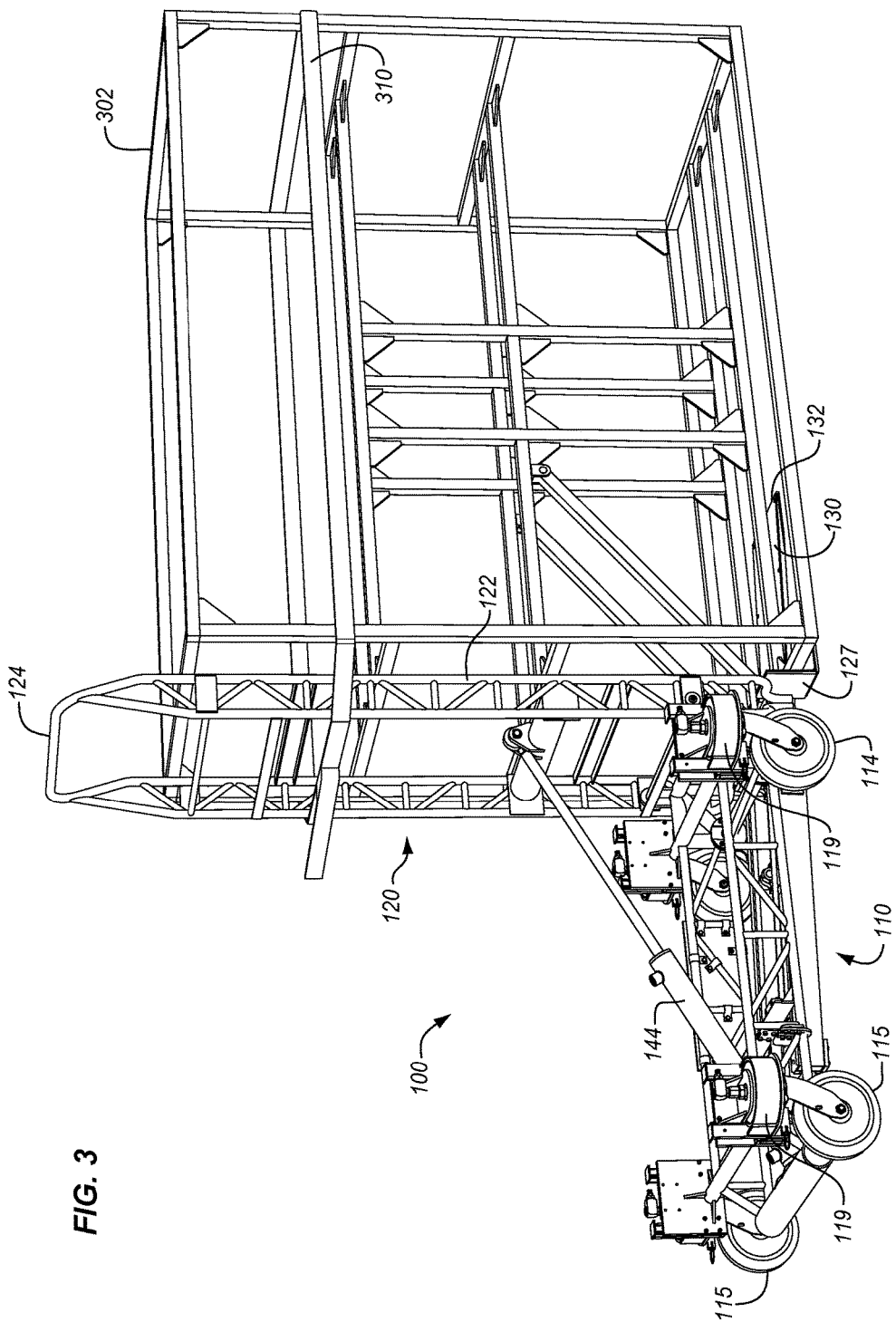
FIGS. 3-6 illustrate an exemplary operation of a hand truck.

FIGS. 3-6 illustrate an exemplary operation of hand truck 100. In FIG. 3, an operator (i.e., a human operator) moves hand truck 100 near an edge of an object 302 to be moved. The operator may attach a portable hydraulic pump (not shown) to mechanical actuator 144. The portable hydraulic pump may comprise a push button, lightweight battery powered unit that provides hydraulic pressure to mechanical actuator 144. The operator may then wedge the leading edge 128 (not visible) of toe plates 127 underneath object 302. Object 302 rides along the top surface of toe plates 127 until object 302 engages co-planar members 122. If desired, the operator may adjust the pressure in air bags 119 to lower the height of carriage 110 to allow toe plates 127 to slide underneath object 302. With toe plates 127 properly positioned, the operator may secure object 302 to co-planar members 122, such as a strap 310.

With object 302 secured to or otherwise engaged with hand truck 100, the operator may extend stabilizer plate 130 outward from carriage 110 as illustrated in FIG. 3. Stabilizer plate 130 is intended to stabilize hand truck 100 when elongated frame 120 is pivoted with object 302. To properly stabilize hand truck 100, stabilizer plate 130 may be centered on base member 112 (see FIG. 2) so that it extends underneath object 302. The length at which stabilizer plate 130 is extended from carriage 110 may depend on the weight of object 302. In one embodiment, end 132 of stabilizer plate 130 (see FIG. 1) extends from carriage 110 at least as far as the center of gravity of object 302 when object 302 is tilted between 40° to 60° by hand truck 100.

Figure 4:
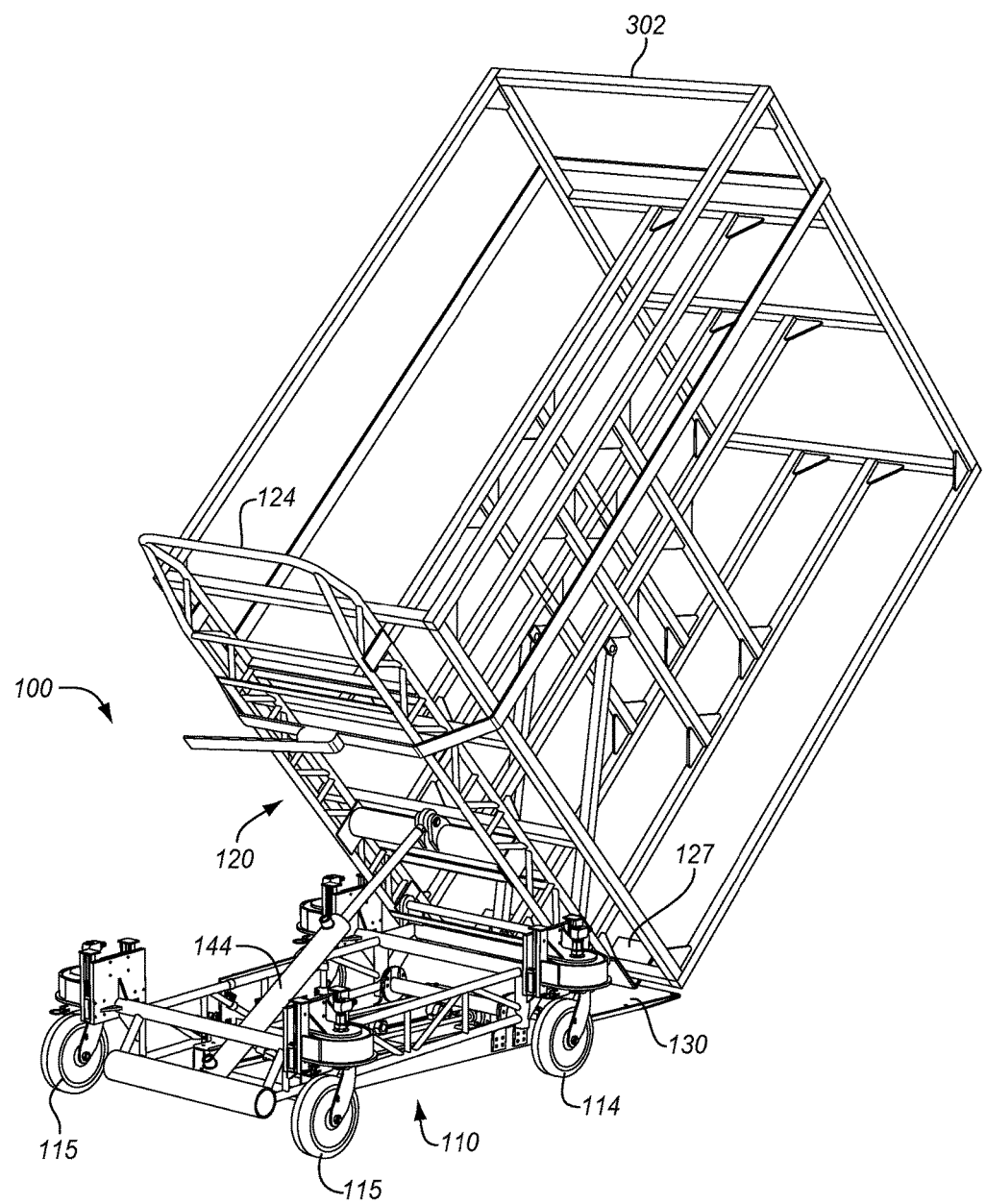

With stabilizer plate 130 extended, the operator may activate mechanical actuator 144 to pivot elongated frame 120 in relation to carriage 110 (see FIG. 4). This tilts object 302 backward toward carriage 110. Because stabilizer plate 130 is extended, the weight of object 302 is at least partially supported by stabilizer plate 130 when hand truck 100 is in this position so that rear casters 115 do not come off the ground. The operator may continue to activate mechanical actuator 144 until elongated frame 120 is tilted back onto carriage 110 and has a horizontal orientation (see FIG. 5). At this point, the weight of object 302 is balanced on front casters 114 and rear casters 115. Thus, the operator may retract stabilizer plate 130 into carriage 110 so that hand truck 100 can be moved (see FIG. 6). The operator may also adjust the pressure in air bags 119 to raise the height of carriage 110. At this time, the operator may move object 302 with hand truck 100 to a desired location.

Figure 5:
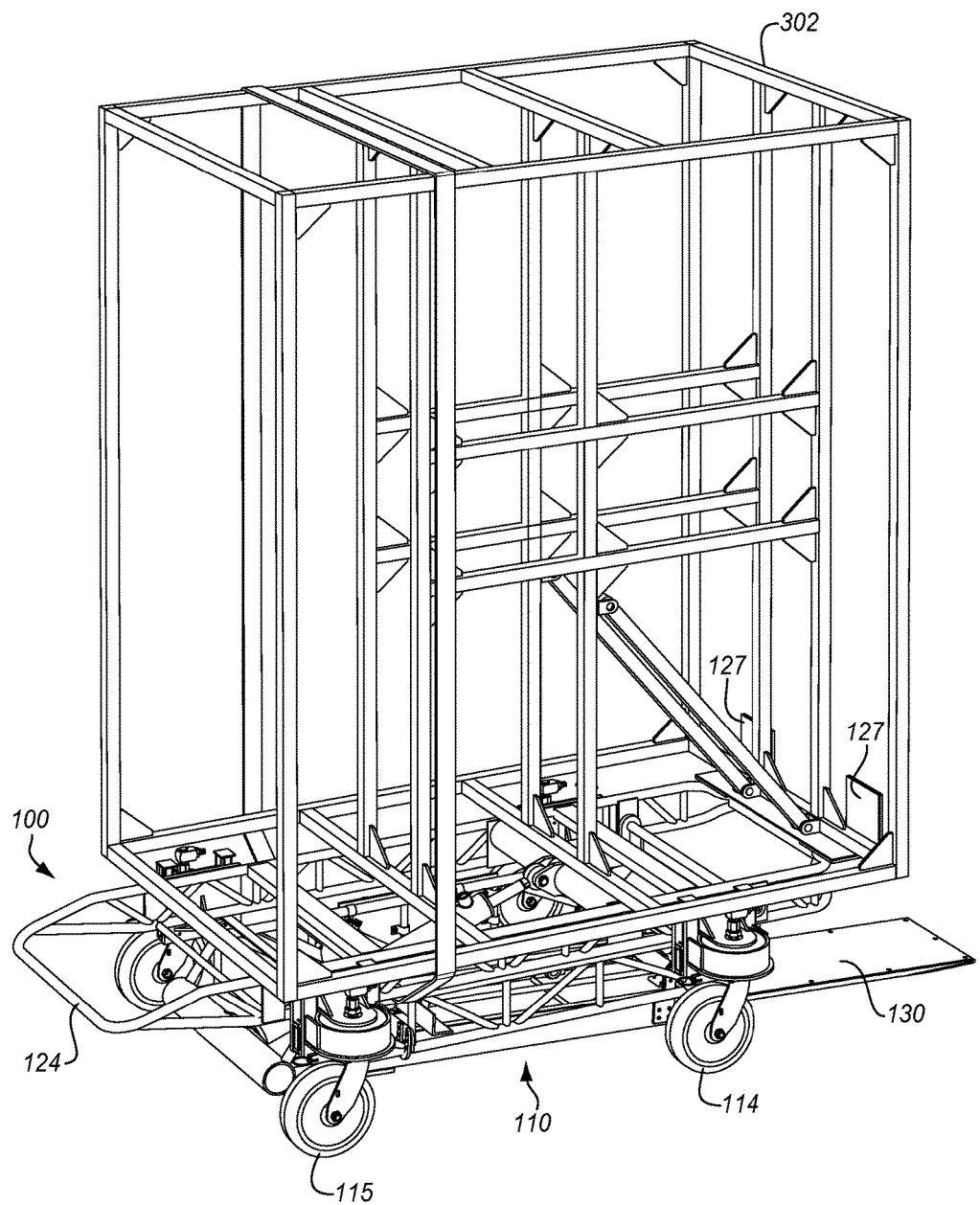
Figure 6:
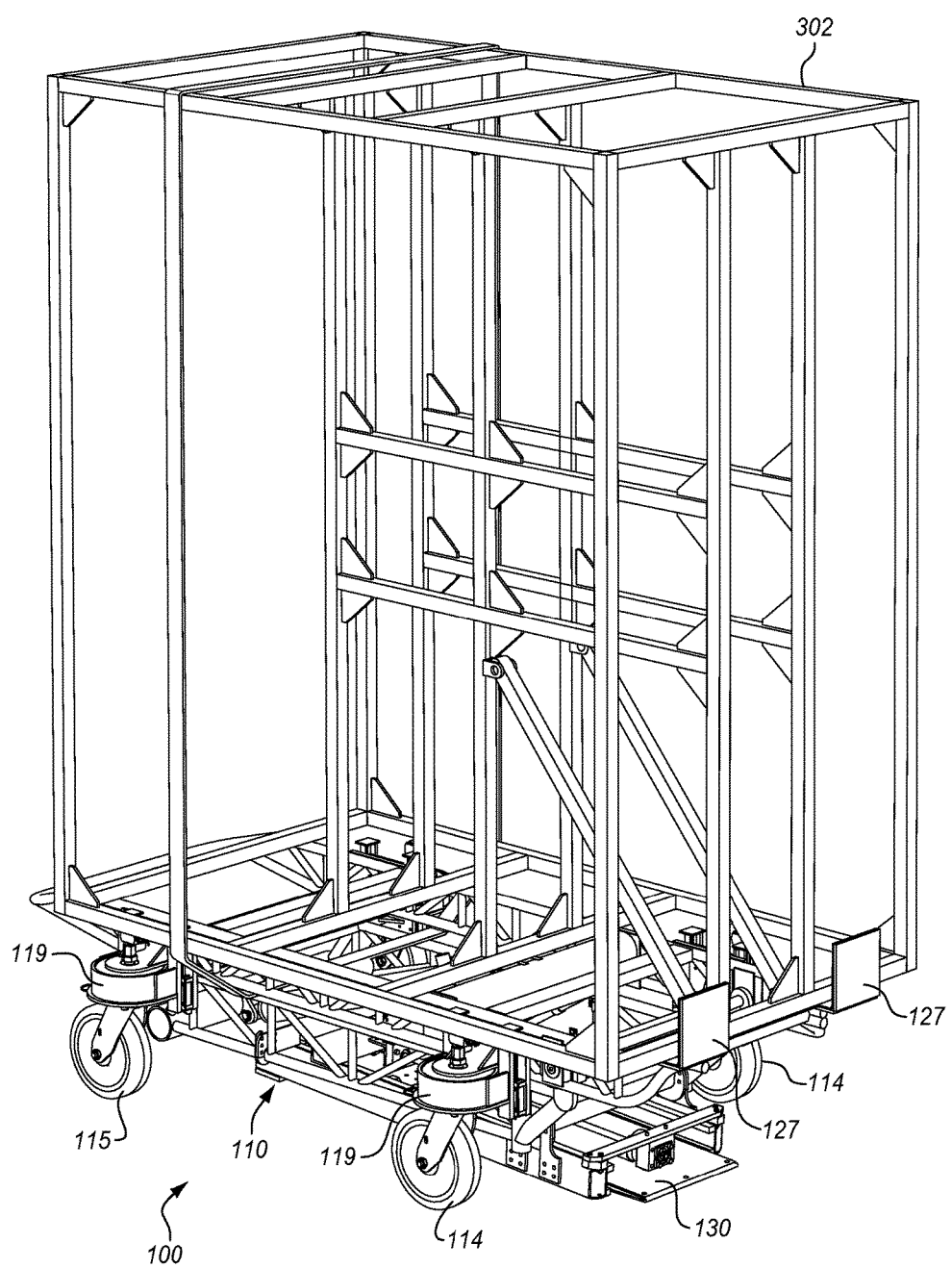

When the operator has moved hand truck 100 to a desired location, the operator may again adjust the pressure in air bags 119 to lower the height of carriage 110. The operator may extend stabilizer plate 130 outward from carriage 110 as illustrated in FIG. 5. With stabilizer plate 130 extended, the operator may activate mechanical actuator 144 to pivot elongated frame 120 in relation to carriage 110. This tilts object 302 forward toward the ground. Because stabilizer plate 130 is extended, the weight of object 302 is at least partially supported by stabilizer plate 130 when hand truck 100 is in this position so that rear casters 115 do not come off the ground. The operator may continue to activate mechanical actuator 144 until elongated frame 120 is tilted forward and has a vertical orientation (see FIG. 3). At this point, the weight of object 302 is on the ground and object 302 may be disengaged from hand truck 100.

Hand truck 100 as described herein provides many advantages. For one, hand truck 100 is able to move heavy loads (e.g., 350-550 lbs) because stabilizer plate 130 is able to stabilize hand truck 100 when tilting these heavy loads. Also, hand truck 100 can be tilted with a heavy load without physical effort by the operator due to the use of mechanical actuator 144. Another advantage is that the use of stabilizer plate 130 allows the front casters 114 to be positioned behind pivot member 140 on carriage 110, instead of in front of pivot member 140, to help balance the load. This allows hand truck 100 to have a more narrow and compact profile so that it may be moved through confined spaces with limited width and/or height, such as doorways.

Although specific embodiments were described herein, the scope is not limited to those specific embodiments. Rather, the scope is defined by the following claims and any equivalents thereof.

What is claimed is:

1. An apparatus comprising:
   a hand truck comprising:
      a carriage;
      an elongated frame that connects to a front side of the carriage, and is configured to pivot in relation to the carriage; and
      a stabilizer plate slidably attached to the carriage and configured to extend outward from the front side of the carriage in a linear motion to stabilize the hand truck as the elongated frame pivots in relation to the carriage, and to retract inward toward the front side of the carriage in a linear motion.

2. The apparatus of claim 1 wherein:
   the stabilizer plate is configured to extend outward from the front side of the carriage and contact a floor as the elongated frame pivots backward from a vertical orientation to a horizontal orientation, and as the elongated frame pivots forward from a horizontal orientation to a vertical orientation.

3. The apparatus of claim 1 wherein the hand truck further comprises:
   a toe plate member that extends at an angle from a first end of the elongated frame to engage a load.

4. The apparatus of claim 3 wherein:
   the toe plate member includes a first L-shaped toe plate and a second L-shaped toe plate that are spaced apart by an opening; and
   the stabilizer plate extends and retracts through the opening.

5. The apparatus of claim 1 wherein:
the carriage includes:
- a base member that is horizontally disposed;
- front casters attached to the base member toward the front side of the carriage; and
- rear casters attached to the base member toward a back side of the carriage.

6. The apparatus of claim 5 wherein the hand truck further comprises:
a mechanical actuator that connects between the base member and the elongated frame, and extends and retracts to pivot the elongated frame in relation to the carriage about a pivot member.

7. The apparatus of claim 6 wherein:
the mechanical actuator comprises a hydraulic cylinder.

8. The apparatus of claim 6 wherein:
the front casters are mounted between the pivot member and the rear casters.

9. The apparatus of claim 5 wherein the hand truck further comprises:
air bags attached between the front casters and the base member, and between the rear casters and the base member to adjust a height of the carriage.

10. The apparatus of claim 5 wherein the hand truck further comprises:
- a linear actuator that connects between the base member and the stabilizer plate;
- wherein the base member includes tracks that slidably engage with opposing sides of the stabilizer plate;
- wherein the linear actuator applies linear motion to the stabilizer plate to extend and retract the stabilizer plate on the tracks.

11. The apparatus of claim 1 wherein the hand truck further comprises:
an abrasion-resistant coating applied to at least one surface of the stabilizer plate.

12. A hand truck comprising:
- a carriage;
- an elongated frame that connects to a front side of the carriage via a pivot member, wherein the elongated frame includes a toe plate member that extends at an angle from a first end of the elongated frame to engage a load;
- a stabilizer plate; and
- a linear actuator that connects between the carriage and the stabilizer plate;
- wherein the carriage includes tracks that slidably engage with opposing sides of the stabilizer plate;
- wherein the linear actuator applies linear motion to the stabilizer plate to extend and retract the stabilizer plate from the front side of the carriage on the tracks.

13. The hand truck of claim 12 further comprising:
cam followers having a stud that connects to the stabilizer plate, and having an outer ring that engages the tracks.

14. The hand truck of claim 12 wherein:
the linear actuator comprises:
- a lead screw having a threaded shaft attached at one end to the carriage, and a nut that is threaded onto the threaded shaft and connected to the stabilizer plate; and
- an electric motor that provides a spinning motion to the lead screw to cause translation of the stabilizer plate.

15. The hand truck of claim 12 wherein:
- the stabilizer plate is an elongated member having a first end and an opposing second end along a length of the elongated member;
- the first end of the stabilizer plate extends outward from the carriage and through an opening in the toe plate member to contact the floor; and
- the stabilizer plate is tapered toward the first end.

16. The hand truck of claim 12 further comprising:
an abrasion-resistant coating applied to at least one surface of the stabilizer plate.

17. The hand truck of claim 12 wherein:
the carriage comprises:
- a base member that is horizontally disposed;
- front casters attached to the base member toward a front side of the base member;
- rear casters attached to the base member toward a rear side of the base member; and
- air bags attached between the front casters and the base member, and between the rear casters and the base member to adjust a height of the carriage.

18. The hand truck of claim 17 further comprising:
a mechanical actuator that connects between the base member and the elongated frame, and extends and retracts to pivot the elongated frame in relation to the carriage about the pivot member.

19. The hand truck of claim 18 wherein:
the mechanical actuator is configured to pivot the elongated frame in relation to the carriage at least 90 degrees.

20. The hand truck of claim 17 wherein:
the front casters are mounted between the pivot member and the rear casters.

* * * * *